United States Patent [19]
Haynie et al.

[11] Patent Number: 5,729,448
[45] Date of Patent: Mar. 17, 1998

[54] LOW COST HIGHLY MANUFACTURABLE DC-TO-DC POWER CONVERTER

[75] Inventors: Carl R. Haynie, Pilot Hill; Mathew A. Nieberger, Rocklin, both of Calif.

[73] Assignee: Hewlett-Packard Company, Palo Alto, Calif.

[21] Appl. No.: 741,801

[22] Filed: Oct. 31, 1996

[51] Int. Cl.$^6$ .................................................. H02M 3/335
[52] U.S. Cl. .................................................. 363/97; 363/21
[58] Field of Search .................................. 363/21, 37, 49, 363/97; 320/13, 48; 307/108; 323/224; 327/452

[56] References Cited

U.S. PATENT DOCUMENTS

| | | | |
|---|---|---|---|
| 4,229,688 | 10/1980 | Knox et al. | 320/48 |
| 4,686,616 | 8/1987 | Williamson | 363/21 |
| 5,381,298 | 1/1995 | Shaw et al. | 361/232 |
| 5,450,304 | 9/1995 | Cox | 363/21 |
| 5,592,071 | 1/1997 | Brown | 323/282 |
| 5,592,073 | 1/1997 | Redlich | 323/300 |

OTHER PUBLICATIONS

"Programmable Precision References", 1995, Motorola Linear/Interface ICs Device Data, Motorola Semiconductor Technical Data, TL431, pp. 5–17 –5–24.

"Linear Circuits –Voltage Regulators/Supervisor, Special Functions, and Building Blocks", Texas Instruments, Technical Data Sheet, vol. 3, 1992, pp. 4–143 –4–152.

Primary Examiner—Adolf Berhane
Attorney, Agent, or Firm—David A. Plettner

[57] ABSTRACT

A highly manufacturable low cost DC-to-DC power converter uses a control circuit constructed from a '555 type timer IC and a precision voltage reference. The output of the '555 timer is used to drive a MOSFET transistor that alternately energizes and de-energizes a primary winding of a transformer, thereby energizing secondary windings of the transformer. The voltage at the secondary windings is rectified and filtered to form the regulated output supply voltages. A feedback control signal is generated based on a difference between a reference voltage and the a regulated output supply voltage. Based on the feedback control signal, a control window is established within the '555 timer that determines the charging and discharging times of a capacitor. Since the charging and discharging times of the capacitor are exponential, changing the feedback control signal changes the control window, which in turn changes the charging time with respect to the discharging time. While the times change with respect to each other, the sum of the charging time and the discharging time remains relatively constant, so the oscillation frequency remains relatively constant. Accordingly, the present invention achieves pulse width modulation (PWM) type control at a cost much lower than the cost of commercially available controller ICs.

16 Claims, 6 Drawing Sheets

LOW COST HIGHLY MANUFACTURABLE DC-TO-DC POWER CONVERTER

FIELD OF THE INVENTION

This invention relates to power converters. More specifically, this invention relates to a DC-to-DC power converter and a method and apparatus for controlling a power circuit topology known in the art as a "flyback power converter."

DESCRIPTION OF RELATED ART

Within computing devices and other electronic systems, it is common for various discrete components to require power supply signals of various voltages. For example, within a single computer system, it is common for a central processing unit (CPU) to operate at 3.3 volts, memory circuits and other logic to operate at 5.0 volts, and various other specialized components to operate at 9.0, 12.0, or 15.0 volts. In addition, it is common for some of these voltage levels to be negative with respect to ground, positive with respect to ground, or isolated.

A typical problem faced by designers is that a power supply signal must be obtained from a specific connection or interface, but the specific connection or interface does not supply the proper voltage level and/or the proper current level. For example, many CPUs now operate at 3.3 volts, but must draw power from a CPU socket that only supplies 5.0 volts. Similarly, it is common for an interface card to require a variety of voltages, such as 5.0 or 9.0 volts, even though the required voltage is not supplied to the interface card.

To address this problem, a designer must incorporate a DC-to-DC power converter into the design. Many DC-to-DC power converter solutions are based upon discrete specialized integrated circuits (ICs) from companies such as Maxim, Linear Technologies, National Semiconductor, as well as many other companies. Such power converter ICs are available in a wide variety of designs, and generally require the addition of an external circuit consisting of an inductor or a transformer, Schottky diodes, and in some cases, an external MOSFET switching device and a current sense resistor, to complete the DC-to-DC power converter.

While such power converter ICs are convenient to use in a design, they have three main disadvantages. First, they are costly. Generally, the price of even the simplest IC is more than $1.00, even in significant volumes. In addition, when added to the cost of the other external components required to complete the DC-to-DC power converter, the cost jumps to approximately $3.50–$4.00.

Second, no industry standards have emerged. As a result, the ICs available from one supplier are not interchangeable with those from another supplier. The specific IC must therefore be sourced from a single supplier, which makes the entire product line vulnerable to the performance of that supplier.

Third, many of the power converter ICs employ control schemes that are less than optimal from the standpoint of overall performance. It is common for power converter ICs to use either "pulse frequency modulation" (PFM) or "bang-bang" schemes. PFM control schemes use a pulse stream of varying frequency and relatively constant pulse width to alternatively energize and de-energize a capacitor, inductor, or transformer. PFM control schemes work well as long as the load current remains high, but if the load current is reduced to a small fraction of the maximum current load, the pulse frequency drops significantly. Since the growth of the output voltage ripple of a PFM-based converter is inversely proportional to the pulse frequency, the ripple becomes objectionable at light load levels. To address this problem, a designer is forced to add a very large output capacitor to reduce the output voltage ripple to acceptable levels.

A similar problem exists with bang-bang control schemes. Bang-bang control schemes turn on a converter to supply a charging current to an output capacitor until the desired supply voltage is reached. Then the supply current is turned off. As the load draws charge off the capacitor, the voltage of the capacitor is lowered until it reaches a threshold, at which point the supply current is turned back on and the capacitor is recharged. Bang-bang-based converters produce a ripple voltage that is large and undesirable, and the ripple voltage cannot be corrected by using an output capacitor.

Pulse width modulation (PWM) control schemes are also used in the power conversion industry, and avoid many of the problems discussed above. PWM control schemes also use a pulse stream to alternatively energize and de-energize a capacitor, inductor, or transformer. However, the pulse width varies with the load, not the pulse frequency. Since the pulse frequency remains relatively constant, output voltage ripple is minimized. Unfortunately, PWM solutions do not exist among DC-to-DC power converter ICs that convert low voltages, such as 3.3 volts, to higher voltages, such as 5 and 9 volts.

SUMMARY OF THE INVENTION

The present invention is a power converter circuit that uses an inexpensive and easy to manufacture control circuit. In one embodiment, the control circuit is implemented using a '555 type timer circuit, a precision voltage reference, and a small number of resistors, capacitors, and diodes.

The control circuit generates a gate control signal that oscillates between "on" and "off" states, and drives a transistor that alternately energizes and de-energizes a primary winding of a transformer.

The invention uses a first resistive network to charge a capacitor, and a second resistive network to discharge the capacitor. A feedback control signal is formed based on a comparison between the regulated voltage supply of the power converter and a voltage reference signal. The feedback control signal is used to form a control window that is bounded by an upper control value and a lower control value.

The control window moves in response to the load being driven by the power converter circuit. By moving the control window, the relative charging and discharging times of the capacitor are adjusted with respect to each other, while the sum of the charging and discharging time remains relatively constant. The gate control signal is derived from the charging and discharging times, with the "on" interval of the gate control signal equal to the time required to charge the capacitor from the lower control value to the upper control value through the first resistor network (plus an IC response time), and the "off" interval equal to the time required to discharge the capacitor from the upper control value to the lower control value through the second resistor value (plus an IC response time). Since the "on" and "off" times vary, but the total of the "on" and "off" times remains relatively constant, the present invention implements pulse width modulation regulation.

DETAILED DESCRIPTION OF THE PREFERRED EMBODIMENTS

Figure 1:
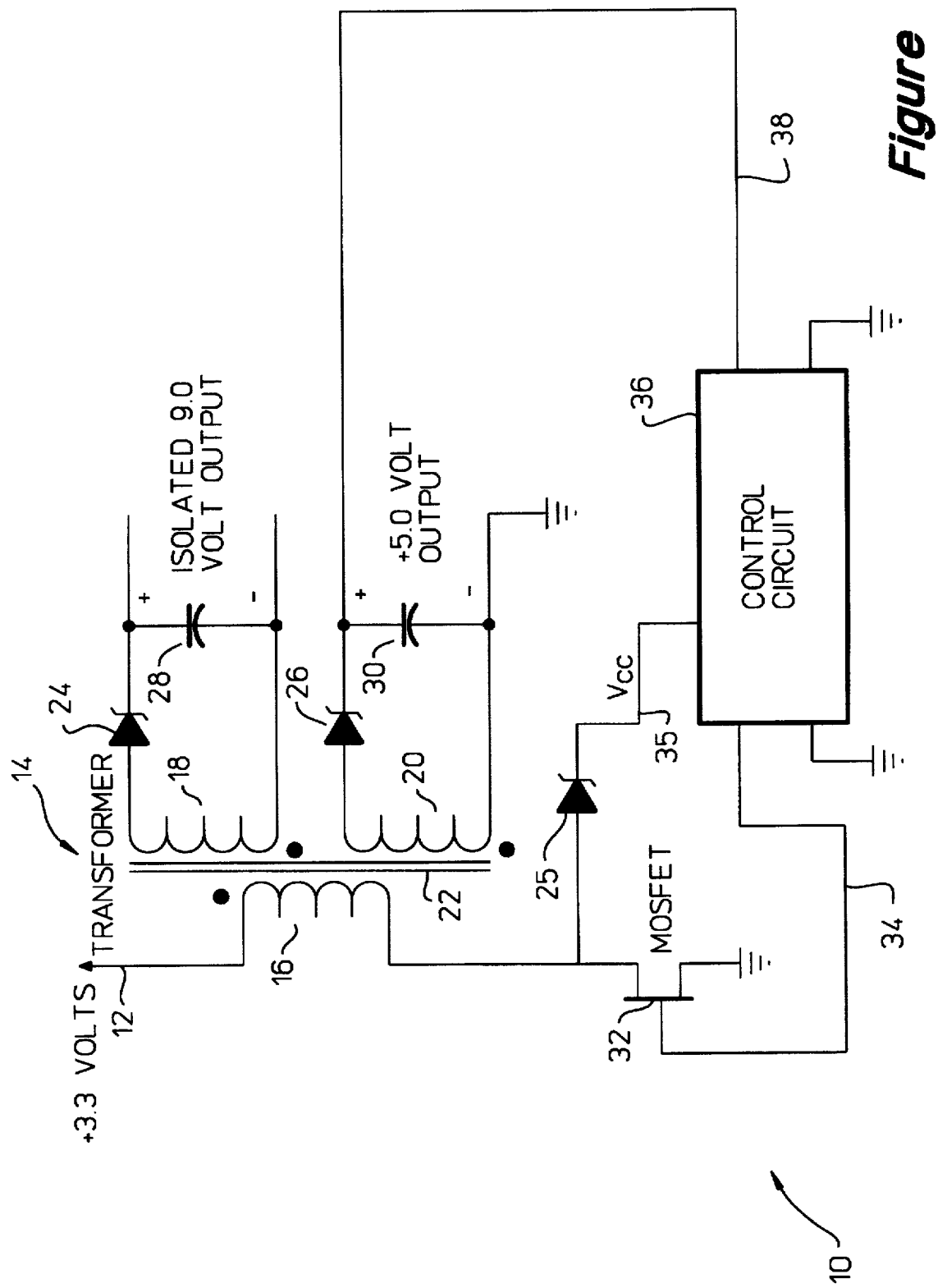
FIG. 1 is a block diagram of a power converter circuit known in the art as a "flyback power converter."

FIG. 1 is a block diagram of a power converter circuit 10 known in the art as a "flyback power converter." Although the present invention is described with reference to circuit 10, it may be incorporated into other power circuit topologies, and those skilled in the art will recognize how to adapt the teachings set forth herein to incorporate the present invention in other types of power circuits.

Power converter circuit 10 includes +3.3 volt power supply 12, flyback transformer 14, Schottky diodes 24, 25, and 26, capacitors 28 and 30, MOSFET transistor 32, and control circuit 36. Flyback transformer 14 includes primary winding 16, secondary windings 18 and 20, and core 22.

Primary winding 16 has a first terminal coupled to +3.3 volt power supply 12 and a second terminal attached to a drain terminal of MOSFET 32. A source terminal of MOSFET 32 is coupled to ground and a gate terminal of MOSFET 32 is coupled to gate control line 34 from control circuit 36. Also coupled to the drain terminal of MOSFET 32 is an anode of Schottky diode 25. A cathode of diode 25 is coupled to power line 35, which provides power supply signal $V_{CC}$ to control circuit 36.

A magnetic field created by primary coil 16 is coupled via core 22 to secondary windings 18 and 20. Secondary winding 18 has a winding ratio with respect to primary winding 16 sufficient to produce a voltage of approximately 9.0 volts. A first terminal of winding 18 is coupled to a negative terminal of capacitor 28. A positive terminal of capacitor 28 is coupled to a cathode of Schottky diode 24, and an anode of diode 24 is coupled to a second terminal of winding 18. Schottky diode 24 ensures that capacitor 28 is charged, but not discharged, by winding 18, and that an isolated 9.0 volt power supply signal is developed over the positive and negative terminals of capacitor 28.

Secondary winding 20 has a winding ratio with respect to primary coil 16 sufficient to produce a voltage of approximately 5.0 volts. A first terminal of winding 20 is coupled to a negative terminal of capacitor 30 and to ground. A positive terminal of capacitor 30 is coupled to a cathode of Schottky diode 26, and an anode of diode 26 is coupled to a second terminal of winding 20. Schottky diode 26 ensures that capacitor 30 is charged, but not discharged, by winding 20, and that a +5.0 volt power supply signal is developed at the positive terminal of capacitor 30. The +5.0 volt power supply signal is provided to control circuit 36 via feedback line 38.

In FIG. 1 capacitors 28 and 30 are provided to minimize low frequency output voltage ripple in the power supply signals generated by power converter circuit 10. Accordingly, capacitors 28 and 30 have relatively large capacitances. In one embodiment of the present invention it is also desirable to filter high frequency RF noise from the power converter circuit. Therefore, in this embodiment, additional capacitors having relatively small capacitances are placed in parallel with capacitors 28 and 30. For example, it has been found that placing a 0.1 μF capacitor and a 1000 pF in parallel with capacitor 28 greatly reduces high frequency RF noise in the isolated 9.0 volt output signal. Likewise, it has been found that placing a 0.1 μF capacitor and a 1000 pF in parallel with capacitor 30 greatly reduces high frequency RF noise in the +5.0 volt output signal.

Within control circuit 36, a compare signal based on the +5.0 volt power supply signal is subtracted from a reference voltage, and the result is amplified to form an error signal. The error signal is then fed to a pulse width modulation (PWM) block that produces an output pulse stream, with the width of each pulse based on the error voltage.

The output pulse stream is fed to MOSFET 32 via gate control line 34. When the +5.0 volt power supply signal strays above +5.0 volts, the pulse width is reduced, MOSFET 32 lowers the duty cycle of the current flowing through winding 16 and the power supply signal returns to +5.0 volts. When the +5.0 volt power supply signal strays below +5.0 volts, the pulse width is increased, MOSFET 32 increases the duty cycle of the current flowing through winding 16 and the power supply signal returns to +5.0 volts.

For flyback-type converters that convert +12.0 volts to +5.0 volts, there are many commercially available and inexpensive ICs that provide the function performed by control circuit 36, with most using pulse frequency modulation (PFM). However, there are few ICs that perform such a function for a flyback-type converter that converts +3.3 volts to +5.0 volts (none using PWM), and those that are available are quite expensive, costing in excess of one dollar each even when purchased in large quantities.

The present invention provides the function performed by control circuit 36 using industry standard off-the-shelf components for a cost of about 70 cents (in large quantities). The present invention uses a precision voltage reference to generate a control current, which in turn is fed to a timer device that is similar to the industry standard '555 timer. The timer device generates control signal 34, which is fed to MOSFET 32.

Figure 2:
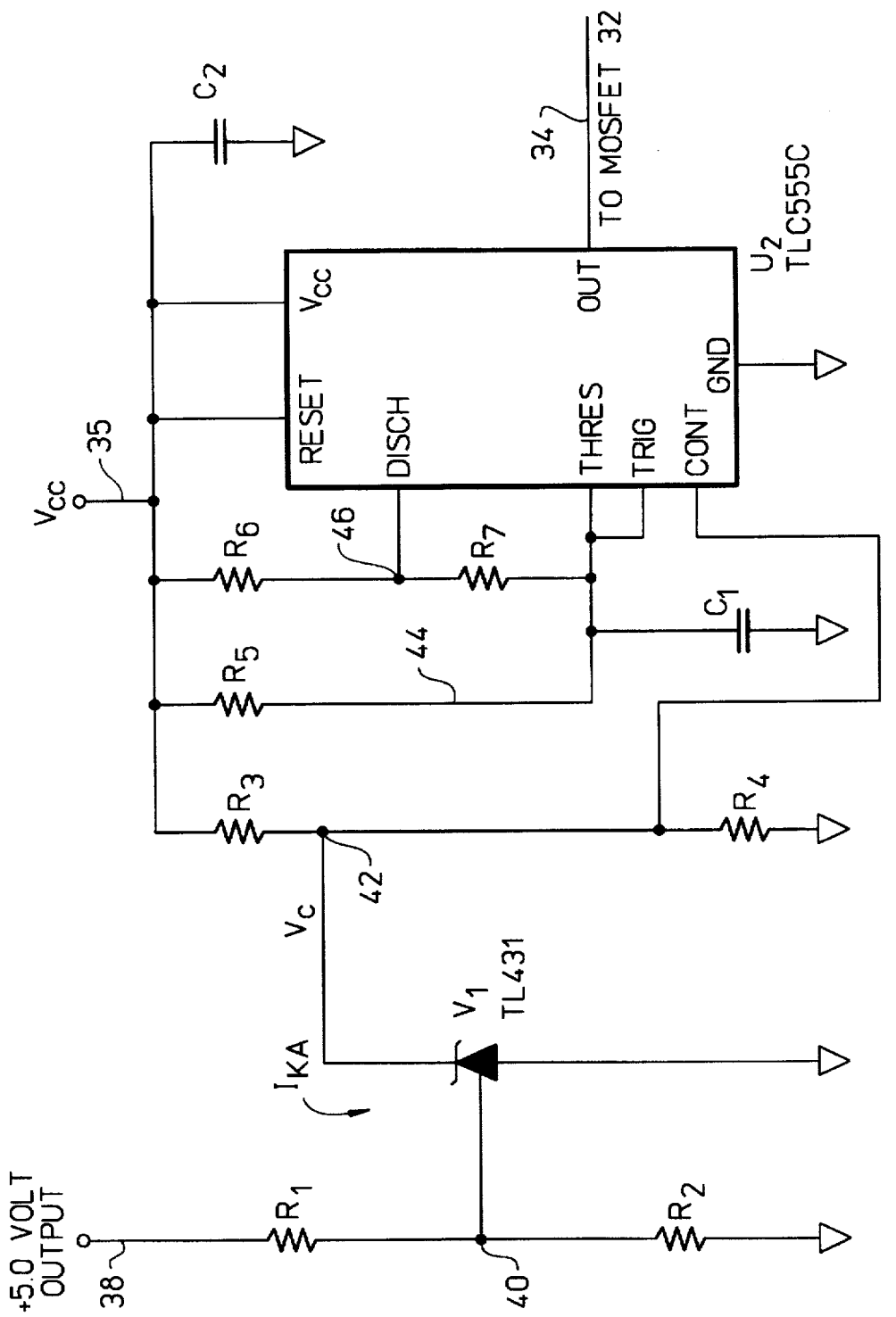
FIG. 2 is a diagram of the control circuit of the present invention, which regulates the power converter circuit shown in FIG. 1.

FIG. 2 is a diagram of control circuit 36 of the present invention. Control circuit 36 includes resistors $R_1$, $R_2$, $R_3$, $R_4$, $R_5$, $R_6$, and $R_7$, capacitors $C_1$ and $C_2$, precision voltage reference $U_1$, and '555 timer $U_2$.

Resistor $R_1$ has a first terminal that is coupled to feedback line 38 in FIG. 1, and resistor $R_2$ has a first terminal that is coupled to ground. Resistors $R_1$ and $R_2$ each have a second terminal that is coupled to node 40. A reference terminal of voltage reference $U_1$ is also coupled to node 40.

Voltage reference $U_1$ also has an anode coupled to ground, and a cathode coupled to node 42. Also coupled to node 42 are first terminals of resistors $R_3$ and $R_4$ and the CONT input of timer $U_2$. Resistor $R_4$ has a second terminal attached to ground and resistor $R_3$ has a second terminal attached to supply voltage $V_{CC}$.

Coupled to node 44 are first terminals of resistors $R_5$ and $R_7$, a first terminal of capacitor $C_1$, and the TRIG and THRES inputs of timer $U_2$. Capacitor $C_1$ has a second terminal coupled to ground and resistor $R_5$ has a second terminal to coupled to supply voltage $V_{CC}$.

Coupled to node 46 is a second terminal of resistor $R_7$, a first terminal of resistor $R_6$, and the DISCH input of timer $U_2$. A second terminal of resistor $R_6$ is coupled to supply voltage $V_{CC}$. Also coupled to supply voltage $V_{CC}$ are the RESET and $V_{CC}$ inputs of timer $U_2$, and a first terminal of capacitor $C_2$. A second terminal of capacitor $C_2$ is couple to ground, as is the GND input of timer $U_2$. Finally, the OUT output of timer $U_2$ is coupled to gate control line 34, which in mm is coupled to the gate terminal of MOSFET 32 in FIG. 2.

Figure 3:
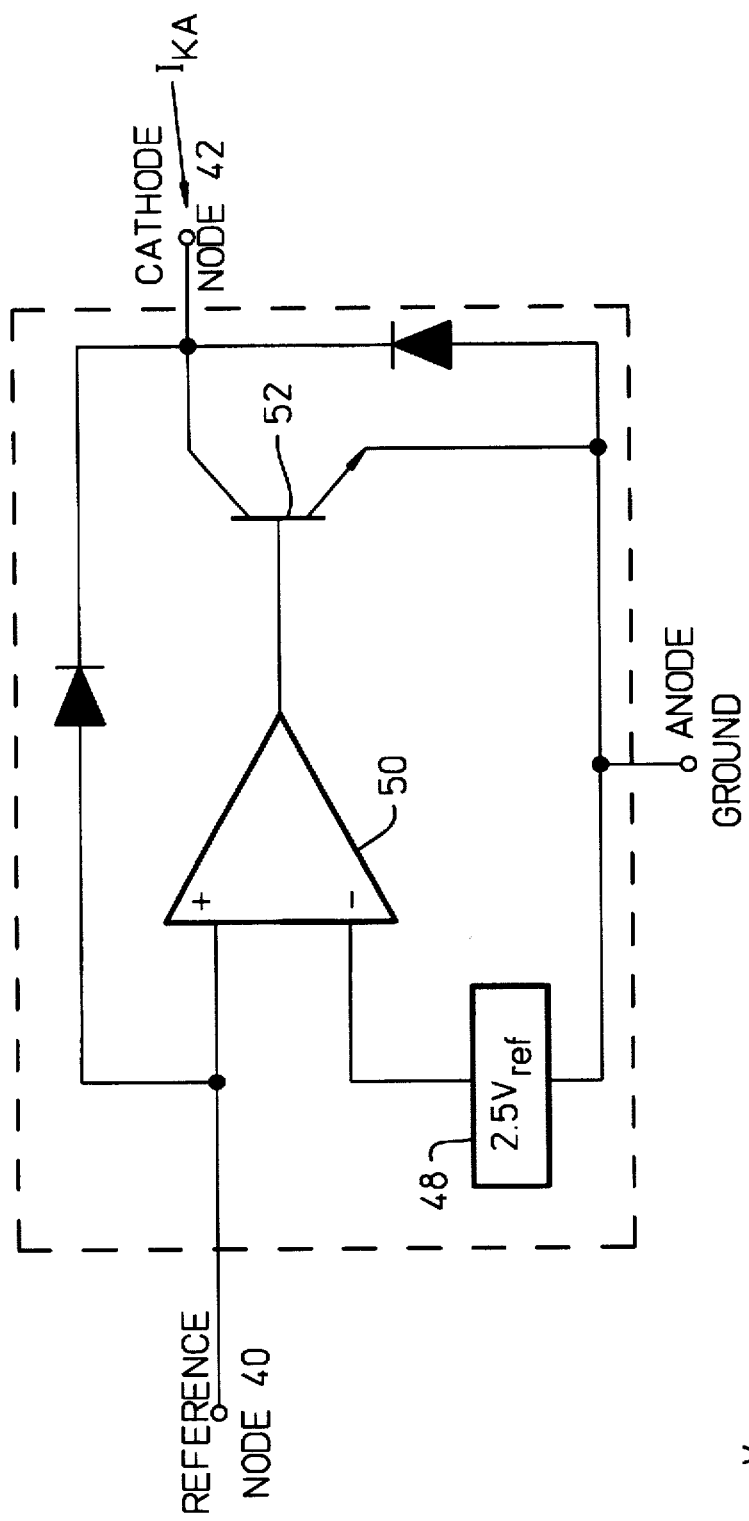
FIG. 3 is a functional block diagram from the Technical Data Sheet for the Motorola TL431 Programmable Precision Reference.

Before discussing circuit 36 in detail, it is helpful to first discuss precision voltage reference $U_1$ and '555 timer $U_2$. FIG. 3 is a functional block diagram from the Technical Data Sheet for the Motorola TL431 Programmable Precision Reference. The Technical Data Sheet is from Revision 5 of the Motorola publication entitled "Linear/Interface ICs Device Data Book," which was published in the fourth quarter of 1995, and is incorporated by reference as if included herein.

The TL431 has a reference input that is compared with 2.5 volt internal reference signal 48. If the reference input is significantly above 2.5 volts, the output of op amp 50 goes high. The high output of op amp 50 is provided to the base of transistor 52 and saturates transistor 52, causing the current IKA that is dram though transistor 52 to be maximized. When the reference input is significantly below 2.5 volts, the output of op amp 50 goes low. This causes transistor 52 to minimize the current IKA. When the reference input is within a narrow zone centered about 2.5 volts, the slope of the curve defined by the current IKA plotted with respect to the reference voltage is fairly steep, having an open loop gain of about 55 dB. It is within this narrow zone that regulation occurs. Any device or combination of devices having similar characteristics may be substituted.

Figure 4:
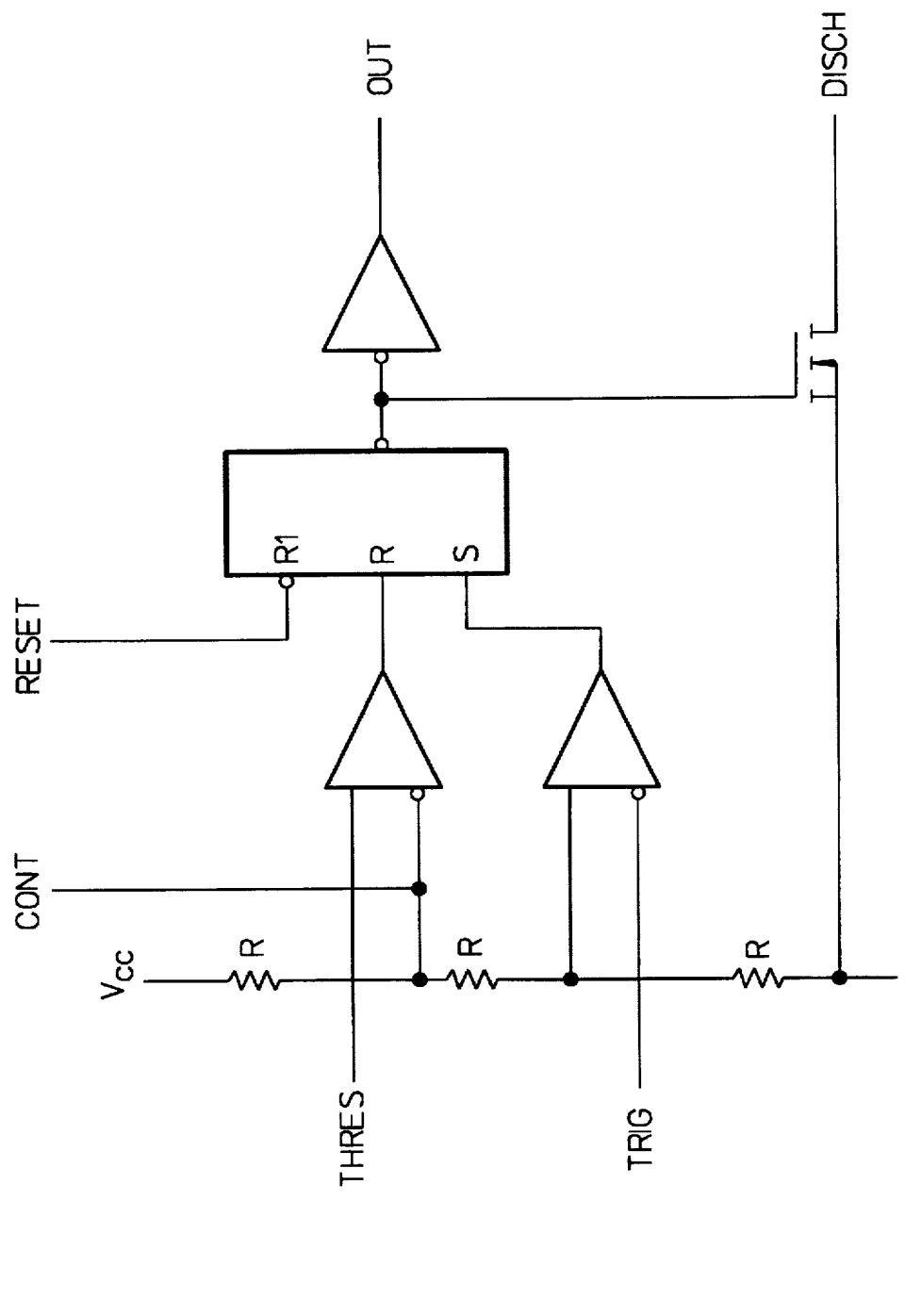
FIG. 4 is a functional block diagram from the Technical Data Sheet for the Texas Instrument TLC555C timing circuit.

FIG. 4 is a functional block diagram from the Technical Data Sheet for the Texas Instrument TLC555C timing circuit. The Technical Data Sheet is from Volume 3 of the 1992 Texas Instrument publication entitled "Linear Circuits— Voltage Regulators/Supervisor, Special Functions, and Building Blocks," and is incorporated by reference as if included herein. This timer is a CMOS version of the popular '555 timer. Because the timer is based on CMOS technology, it will operate at voltages as low as 2.0 volts. As described below, this is important because the timer must operate at approximately 2.8 volts when power converter circuit 10 is starting up, and TTL versions of the '555 timer will not work at such voltage levels. The characteristics of '555 type timers are well known in the art, and need not be recited herein. Any device or combination of devices having similar characteristics may be substituted.

In FIG. 2, the +5.0 volt output signal is applied to the resistor network formed by $R_1$ and $R_2$. In an the embodiment of the present invention shown in FIGS. 1 and 2, $R_1$ and $R_2$ have approximately equal resistances, and therefore the voltage at node 40 is approximately one-half of the +5.0 volt output signal. As described above, precision reference $U_1$ produces a current IKA that is based on the difference between 2.5 volts and the voltage at node 40. The current IKA, in combination with resistors $R_3$ and $R_4$, determine the feedback control voltage $V_C$ at node 42, which in turn is provided to the CONT input of timer $U_2$. Note that the CONT input determines the comparison voltage that is used for comparisons with the THRES input and the TRIG input. The feedback control voltage $V_C$ is given by the equation:

$$V_C = V_{CC}\frac{R_4}{R_3 + R_4} - I_{KA}\frac{R_3 R_4}{R_3 + R_4}.$$

Note that the current into the CONT input of timer $U_2$ is insignificant compared to the other terms in this equation, and therefore can be ignored.

When the OUT terminal (gate control line 34) of timer $U_2$ is high, the DISCH terminal is allowed to float. Accordingly, the voltage on capacitor $C_1$ ramps up toward $V_C$ at a rate governed by the capacitance of $C_1$ and resistance $R_5$ in parallel with the series combination of resistances $R_6$ and $R_7$. The voltage on capacitor $C_1$ is provided to the THRES and TRIG inputs of timer $U_2$, though when the OUT terminal is high, only the THRES input is of primary interest.

At the same time that the voltage being provided to the THRES input is rising, the feedback control voltage being supplied to the CONT input is being determined by the load being driven by power converter circuit 10. The load determines the voltage at the CONT input because the voltage that is fed back on feedback line 38 causes precision voltage reference $U_1$ to produce a current IKA, which in mm pulls down the voltage $V_C$ at node 42. When the voltages at the CONT input and the THRES input are at the same level, the OUT terminal of timer $U_2$ goes low.

Note that the rate at which the voltage at the THRES input increases is independent of the load on power converter circuit 10, and is determined by the values of resistors $R_3$, $R_6$, and $R_7$, and capacitor $C_1$. On the other hand, the voltage level at the CONT input is dependent upon the load. A smaller load causes a slightly higher supply voltage on feedback line 38, which causes a larger current IKA and a lower feedback control voltage $V_C$ at the CONT input. Similarly, a larger load causes a slightly lower supply voltage on feedback line 38, which causes a smaller current IKA and a higher feedback control voltage $V_C$ at the CONT input.

When the OUT terminal (gate control line 34) of timer $U_2$ is high, MOSFET 32 is "on." When MOSFET 32 is first turned on, the voltage over primary winding 16 has a magnitude of approximately 3.3 volts. As MOSFET 32 remains on, the magnitude of the current flowing through primary winding 16 increases and the voltage across winding 16 remains constant. When the OUT terminal of timer U2 goes low, MOSFET 32 turns off, which creates a current discontinuity in winding 16. The energy in transformer 14 is stored as magnetic flux in core 22. The presence of the magnetic flux in core 22 requires currents to flow through windings 16, 18, and 20, such that the sum of the currents multiplied by the respective number of turns of each winding remains continuous. Therefore, when current is interrupted in winding 16, the sum of the current that was flowing in winding 16 multiplied by the number of turns of winding 16 is transferred to the sum of the current-turns product of windings 18 and 20, thereby maintaining continuity. Accordingly, the currents through windings 18 and 20 increase and charge capacitors 28 and 30 to their respective supply voltages. A small residual amount of current in winding 16 that does not transfer to windings 18 and 20 is used to provide power to control circuit 36 via power line 35, which will be described in greater detail below.

As described above, when the voltage at the THRES input reaches the voltage at the CONT input, the OUT terminal of timer $U_2$ goes low. At the same time that the OUT terminal of timer $U_2$ goes low, the DISCH terminal is coupled to ground. Accordingly, the voltage at node 44 begins to ramp down toward an asymptotic limit defined by:

$$V_{CC} \frac{R_7}{R_5 + R_7}.$$

Node 44 is coupled to the TRIG input of timer $U_2$, and within timer $U_2$, a voltage divider splits the voltage at the CONT input in half and provides this voltage to a comparator along with the TRIG input. When the voltage level of the TRIG input drops to one-half the voltage level of the CONT input, the OUT terminal goes high, and current again begins to flow through winding 16. Note that the rate at which the voltage at node 44 drops is not dependent upon the load on power converter circuit 10.

Accordingly, the feedback control signal $V_C$ in combination with the voltage splitter in timer $U_2$ form a control window, with the control window having an upper value equal to the feedback control signal $V_C$ and a lower value equal to 0.5 $V_C$. As will be described with in greater detail below with reference to FIG. 6, this feedback-adjusted control window, in combination with the exponential charge and discharge times of capacitor $C_1$, provide the present invention with PWM control.

Control circuit 36 of FIG. 2 produces gate control signal 34 at the OUT terminal of timer $U_2$ having an "on" time $t_1$ and an "off" time $t_2$. The times $t_1$ and $t_2$ are defined as follows:

$$t_1 = \frac{-(R_6 + R_7)R_5}{(R_5 + R_6 + R_7)} C_1 \ln\left(1 - \frac{V_C}{2V_{CC} - V_C}\right) + t_{d1},$$

and $$t_2 = \frac{-R_5 R_7}{(R_5 + R_7)} C_1 \ln\left(1 - \frac{V_C}{2\left(V_C - V_{CC}\left(\frac{R_7}{R_5 + R_7}\right)\right)}\right) + t_{d2},$$

where $t_{d1}$ and $t_{d2}$ are the IC response times and are typically about 2.3 μsec.

Based on the times $t_1$ and $t_2$, the duty cycle and frequency of the gate control signal provided at the OUT terminal of timer $U_2$ are defined as follows:

$$\text{Duty Cycle (\%)} = \frac{t_1}{t_1 + t_2},$$

and $$\text{Frequency (Hz)} = \frac{1}{t_1 + t_2}.$$

The equations that define $t_1$ and $t_2$ are quite complex. The times $t_1$ and $t_2$ are based on the feedback control voltage $V_C$, which in turn is based on the current IKA, which in turn is based upon a the voltage at the output of power converter circuit 10. Though the equations are difficult to solve, it is quite easy to model control circuit 36 using a computer simulation. The results of such a computer simulation will be discussed with respect to FIG. 5 below.

Control circuit 36 receives power from power line 35, which is coupled to diode 25 in FIG. 1, which in turn is coupled to the second terminal of primary winding 16. Capacitor $C_2$ (shown in FIG. 2) has a relatively large capacitance and acts as a low frequency filter to remove voltage ripple. In one embodiment, a capacitor having a relatively small capacitance (such as 0.01 μF) is placed in parallel with capacitor $C_2$ to filter RF noise.

When power converter circuit 10 is operating normally, the voltage produced at power line 35 varies between 7.0 and 12.0 volts, depending on the load driven by power converter circuit 10. Although this is a significant range, it is well within the tolerance of the components shown in FIG. 2. Also, the performance of control circuit 36 is not dependent on the value of supply voltage $V_{CC}$. Rather, the performance of control circuit 36 is dependent on the ratios of the resistances shown in FIG. 2, as well as the resistances within timer circuit $U_2$.

While the value of supply voltage $V_{CC}$ is between 7.0 and 12.0 volts when converter circuit 10 has been operating for a sufficient period of time, a different situation occurs when power converter circuit 10 is first powered up. When power converter circuit 10 is first power up, the only voltage that exists in the circuit is +3.3 volt supply signal 12. Since MOSFET 32 is initially off, this supply signal flows through coil 16 and diode 25. The voltage drop over diode 25 is about 0.5 volts, therefore, capacitor $C_2$ will begin to ramp up from 0.0 volts to +2.8 volts.

The TI TLC555C timer will operate at any voltage between 2.0 and 15.0 volts, so when the voltage across capacitor $C_2$ reaches about 2.0 volts, timer $U_2$ will begin to operate. Note that at this point in time, precision voltage reference $U_1$ is still inactive. When inactive, voltage reference $U_1$ has no effect on timer $U_2$, so timer $U_2$ will still begin to oscillate.

When timer $U_2$ begins to operate, the OUT terminal will go high. At 2.8 volts, the voltage drop through timer $U_2$ is about 0.4 volts. Therefore, during startup the maximum voltage provided on gate control line 34, which is coupled to the gate of MOSFET 32, is about 2.4 volts. It is important that MOSFET 32 be fully mined on at this low gate voltage during the initial startup cycle. The MOSFET specified in the parts list below meets this criteria and operates with a gate voltage as low as 2.0 volts.

Once MOSFET 32 turns on, the current through winding 16 begins to increase. During this period, timer $U_2$ and the associated RC network are powered by the charge stored in capacitor $C_2$. At some point thereafter, capacitor $C_2$ will provide enough charge to capacitor $C_1$ to cause the voltage at the CONT input to equal the THRES input, which will reset the flip-flop of timer $U_2$ and therefore drive OUT terminal of timer $U_2$ low. MOSFET 32 will turn off, which will cause current to flow through secondary windings 18 and 20. A small current will also flow into capacitor $C_2$, thereby raising the voltage across capacitor $C_2$ higher than it was during the first cycle. This cycle will continue, with the voltages rising in power converter circuit 10 until the +5.0 volt output reaches the regulated voltage.

Below is a parts list for an embodiment of the present invention that conforms with FIGS. 1 and 2. Information pertaining to timer $U_2$, precision voltage reference $U_1$, and the RF filtering capacitors is given above. Transformer 14 is a custom transformer constructed to operate with the present invention, and those skilled in the art understand the attributes, such as core permeability and rams ratio, required to produce the supply voltages desired. All transistors have a 1% tolerance.

| Parts List | |
|---|---|
| Schottky Diodes 24, 25, and 26 | Motorola Part No. MBRS 340TS |
| MOSFET Transistor 32 | Motorola Part No. MMDF4N01HD |
| Capacitor 28 | 100 μF – 25 Volt |
| Capacitor 30 | 220 μF – 10 Volt |
| Capacitor $C_1$ | 220 pF |

-continued

| Parts List | |
|---|---|
| Capacitor $C_2$ | 10.0 µF |
| Resistors $R_1$ and $R_2$ | 21.5K Ohms |
| Resistor $R_3$ | 1.00K Ohms |
| Resistor $R_4$ | 3.83K Ohms |
| Resistor $R_5$ | 56.2K Ohms |
| Resistor $R_6$ | 10.0K Ohms |
| Resistor $R_7$ | 12.1K Ohms |

Note that Motorola Part No. MMDF4N01HD contains two MOSFETs in a single package. In the embodiment that uses the parts recited above, the two MOSFETs are connected in parallel to lower the "on" resistance of MOSFET 32 of FIG. 1.

With the components recited above, power converter circuit 10 provides a 5.0 volt supply that does not vary more than plus or minus 3% over a wide range of supply loads. As the load varies, the feedback control voltage $V_C$ provided to the CONT input of timer $U_2$ varies between approximately 5 volts and 8 volts.

Figure 5:
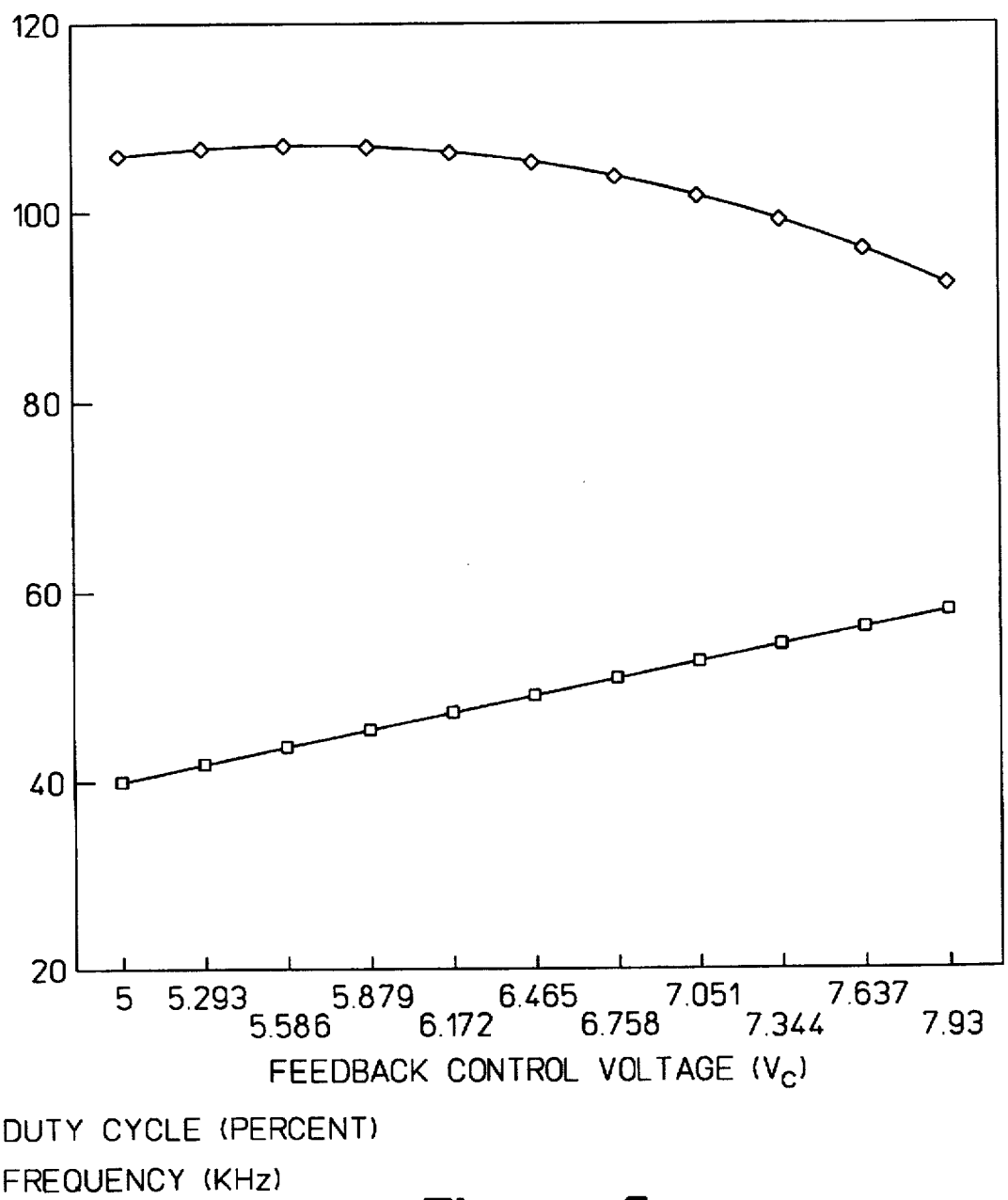
FIG. 5 is a graph showing the performance of the control circuit of FIG. 2.

FIG. 5 is a graph showing the performance of control circuit 36. The feedback control voltage $V_C$ that is provided to the CONT input of timer $U_2$ is shown along the horizontal axis. Duty cycle (in percent) and frequency (in KHz) are plotted along the vertical axis, with duty cycle represented by the solid squares along curve 54 and frequency represented by shaded diamonds along curve 56.

Note that duty cycle curve 54 is almost completely (if not exactly) linear, which is a design goal for PWM converters. While the frequency is not absolutely constant, (constant frequency is a design goal PWM converters), it remains relatively flat. From FIG. 5, it is apparent that the resulting control scheme is much more similar to PWM than PFM. Accordingly, output voltage ripple is minimized across a broad range of power supply loads.

Figure 6:
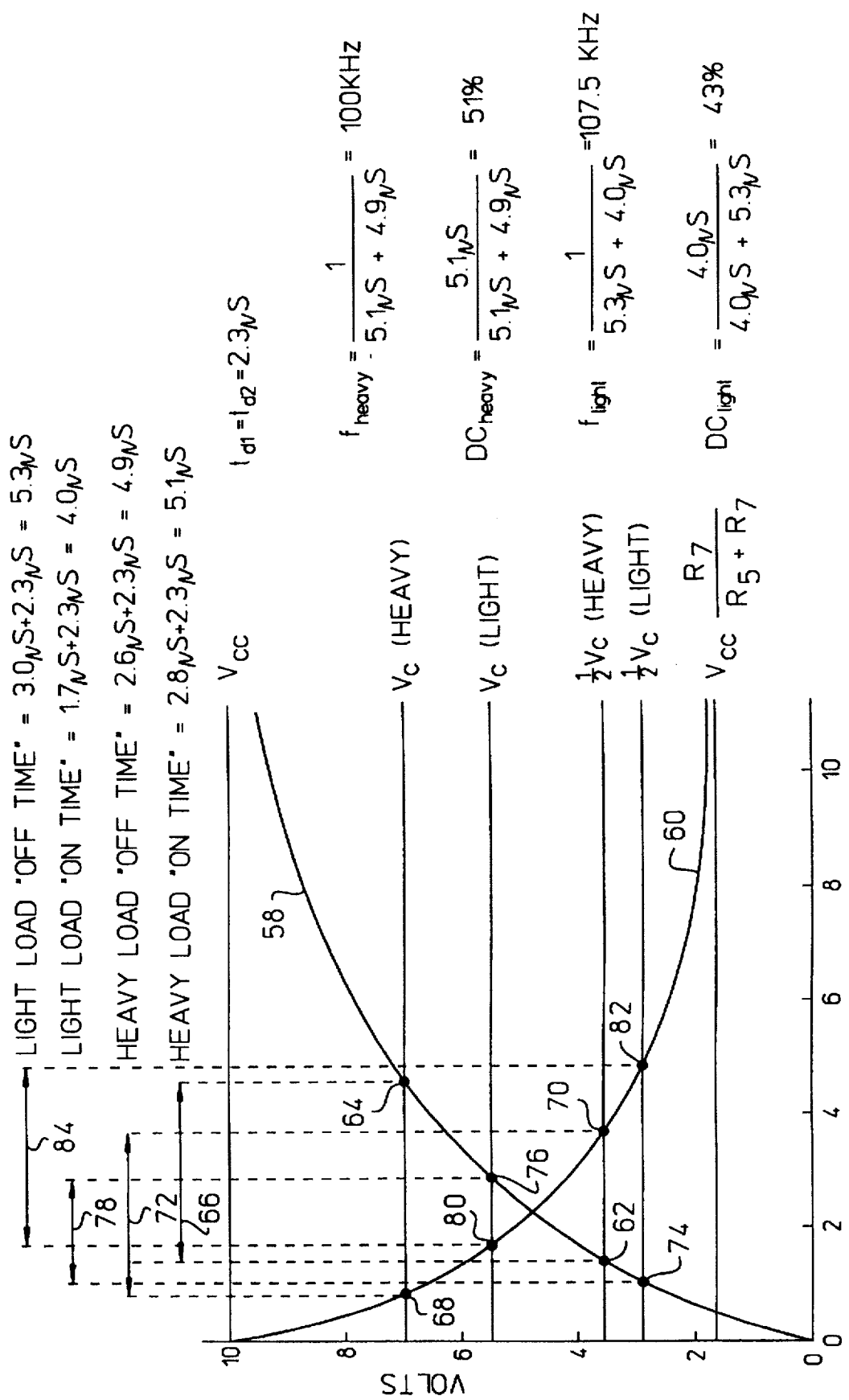
FIG. 6 is a graph showing the RC time constants of the control circuit of FIG. 2.

FIG. 6 is a graph showing the RC time constants of control circuit 36. The purpose of FIG. 6 is to illustrate how control circuit 36 achieves pulse width modulation using a simple '555 timer circuit. In FIG. 6, $V_{CC}$ is assumed to be 10.0 volts.

In FIG. 6, curve 58 shows voltage versus time at node 44 in FIG. 2 (which is supplied to the THRES input of timer $U_2$) when capacitor $C_1$ is charged from 0.0 volts toward $V_{CC}$ (10.0 volts) using the resistor network of $R_5$ in parallel with the series combination of $R_6$ and $R_7$. This is the same resistor network that charges capacitor $C_1$ when the OUT terminal of timer $U_2$ is high. Of course when control circuit 36 is operating, only a small portion of curve 58 is actually realized.

Curve 60 shows voltage versus time at node 44 in FIG. 2 (which is supplied to the TRIG input of timer $U_2$) when capacitor $C_1$ is discharged from $V_{CC}$ (10.0 volts) down toward $$V_{CC} \frac{R_7}{R_5 + R_7}$$

using the resistor network formed by $R_5$ and $R_7$ that is present when the OUT terminal of timer $U_2$ is low. When the OUT terminal is low, the DISCH terminal of timer $U_2$ is coupled to ground. As with curve 58, only a small portion of curve 60 is realized when circuit 36 is operating. The load being driven by power converter circuit 10 does not affect curves 58 and 60, but it does affect the portion of each curve that is used to regulate the output voltages, as will be described below.

FIG. 6 illustrates how shifting the feedback control voltage $V_C$, which is controlled by feedback from the +5.0 volt supply voltage, causes a more steep portion of one curve to be traversed and a less steep portion of the other curve to be traversed.

For example, assume that the load being driven by power converter circuit 10 is heavy, and $V_C$ is at approximately 7 volts ($V_C$ (Heavy) in FIG. 6). Because of the voltage splitter within timer $U_2$, capacitor $C_1$ will begin to charge starting from a voltage of 0.5 $V_C$ (Heavy). This is represented in FIG. 6 at point 62, which is the intersection of curve 58 and approximately 3.5 volts. Capacitor $C_1$ will charge until it reaches point 64, which is the intersection of curve 58 and approximately 7 volts. Accordingly, the "charge" time is represented at line 66 and is approximately 2.8 µsec. As noted above in the equations that define "on" time $t_1$ and "off" time $t_2$, each equation includes an IC response time $t_{d1}$ and $t_{d2}$, respectively, with each response time approximately 2.3 µsec. Accordingly, the total "on" time of MOSFET 32 is the sum of the charge time (2.8 µsec) and the IC response time (2.3 µsec), which is 5.1 µsec.

After capacitor $C_1$ reaches $V_C$ (Heavy) it begins to discharge along curve 60. Accordingly, capacitor $C_1$ will discharge from point 68, which is the intersection of curve 60 and 7 volts, to point 70, which is the intersection of curve 60 and approximately 3.5 volts. The "discharge" time is represented at line 72 and is approximately 2.6 µsec. Therefore, the total "off" time of MOSFET 32 is the sum of the discharge time (2.6 µsec) and the IC response time (2.3 µsec), which is 4.9 µsec.

The oscillation frequency is the reciprocal of the sum of the "on" and "off" times, which is 100.0 KHz. The duty cycle is the "on" time divided by the sum of the "on" and "off" times, which is 51%. At a control voltage of $V_C$ (Heavy), the "on" time is slightly longer than the "off" time because the portion of curve 60 that is traversed is slightly more steep than the portion of curve 58 that is traversed.

Next, assume the load is light, and $V_C$ drops to about 5.5 volts ($V_C$ (Light) in FIG. 6). Capacitor $C_1$ will begin charging from point 74, which is the intersection of curve 58 and approximately 2.75 volts, up to point 76, which is the intersection of curve 58 and approximately 5.5 volts. The "charge" time required to charge capacitor $C_1$ between points 74 and 76 is represented at line 78 and is approximately 1.7 µsec. Therefore, the total "on" time of MOSFET 32 is the sum of the charge time (1.7 µsec) and the IC response time (2.3 µsec), which is 4.0 µsec.

After capacitor $C_1$ reaches $V_C$ (Light) at point 76, it begins to discharge along curve 60 from point 80, which is the intersection of curve 60 and approximately 5.5 volts, and point 82, which is the intersection of curve 60 and approximately 2.75 volts. The "discharge" time required to discharge capacitor $C_1$ between points 80 and 82 is represented at line 84 and is approximately 3.0 µsec. Therefore, the total "off" time of MOSFET 32 is the sum of the discharge time (3.0 µsec) and the IC response time (2.3 µsec), which is 5.3 µsec. At a control voltage of $V_C$ (Light), the "on" time is shorter than the "off" time because the portion of curve 60 that is traversed is less steep than the portion of curve 58 that is traversed. Accordingly, at the lighter load the oscillation frequency is approximately 107.5 KHz and the duty cycle is approximately 43%. Note that the values derived from FIG. 6 for the duty cycles and oscillation frequencies at $V_{CC}$ equal to 7.0 volts and at $V_{CC}$ equal to 5.5 volts matches the data shown in FIG. 5.

As can be seen from FIG. 6, there is little variation in oscillation frequency when the load being driven by power converter circuit 10 is varied between a light load and a heavy load. However, the duty cycle varies significantly, thereby providing a PWM-type control circuit. The present invention achieves PWM control by adjusting a control window that exists between the control voltage $V_C$ and 0.5 $V_C$. Since curves 58 and 60 charge and discharge, respectively, exponentially, adjusting the control window selects a relatively steeper portion of one curve and a relative less steep portion of the other curve, which varies the duty cycle. However, the time lost by selecting a steeper portion of one curve is approximately compensated for by the time gained by selecting a less steep portion of the other curve, so the sum of the "on" and "off" times remains relatively constant, and therefore the oscillation frequency remains relatively constant. The large gain of precision voltage reference $U_1$ compensates for any deviations in component values that may exist from component to component, and ensures precise regulation of the 5.0 volt supply signal occurs for a variety of output loads.

The present invention provides a PWM-like control scheme, and achieves the benefits of PWM control. The output voltage performance provided by the present invention is superior to the performance available using various power converter ICs from major suppliers. The output ripple is minimal over a broad range of loads, therefore a large output capacitor is not required, as is required by a PFM-based power converter coupled to a light load. In addition, the output voltage ripple is constrained to a level smaller than that which would result when using a "bang-bang" power converter scheme.

While the present invention provides superior performance, its main advantage is low cost. The parts from which the invention is constructed are popular and readily available from multiple sources, and are relatively inexpensive. The cost of the parts necessary to construct the present invention are less than $1.00. In contrast, a power converter IC capable of performing the same function and the related parts required to construct a control circuit cost somewhere in the range of $3.50 to $4.00 from a major supplier. It is contemplated that the present invention will be used in a product that will ship over 100,000 units a month. In such a product, the present invention will save more than $3,000,000 a year.

Finally, since the parts are available from many sources, products that incorporate the present invention are not vulnerable to the performance of a single supplier. Suppliers are also denied the opportunity to charge an inflated price for their products, because there is competition from other suppliers.

Although the present invention has been described with reference to preferred embodiments, workers skilled in the art will recognize that changes may be made in form and detail without departing from the spirit and scope of the invention.

What is claimed is:

1. A control circuit for use in a power converter, the power converter having a switch for alternately energizing and de-energizing a primary winding of a transformer, wherein the switch has a gate input for receiving a gate control signal, and the power converter produces a regulated voltage output signal, the control circuit comprising:

a feedback circuit coupled to the regulated voltage output signal, the feedback circuit producing a feedback control signal based on a comparison between a compare signal derived from the regulated voltage output signal and a reference signal;

a control window circuit coupled to the feedback control signal, wherein the control window circuit produces an upper control signal and a lower control signal from the feedback control signal;

a first resistive network coupled to a first energy storage device, wherein a charge time of the first energy storage device is equal to a time interval required to change an electrical state of the first energy storage device from that of the lower control signal to that of the upper control signal such that the charge time varies with the feedback signal;

a second resistive network coupled to a second energy storage device, wherein a discharge time of the second energy storage device is equal to a time interval required to discharge an electrical state of the second storage device from that of the upper control signal to that of the lower control signal such that the discharge time varies with the feedback signal; and a switching circuit coupled to the upper and lower control signals and the first and second resistive networks, for alternately charging the first energy storage device through the first resistive network and discharging the second energy storage device through the second resistive network, and forming the gate control signal, wherein the gate control signal assumes a first state based on the charge time and a second state based on the discharge time.

2. The control circuit of claim 1 wherein the feedback circuit comprises:

a voltage divider that divides the regulated voltage output signal to form the compare signal;

a voltage reference coupled to the compare signal, the voltage reference producing a control current signal based on a comparison between the compare signal and the reference signal; and a third resistive network coupled to the control current signal, for converting the control current signal into the feedback control signal.

3. The control circuit of claim 1 wherein the control window circuit comprises a voltage divider, wherein the upper control signal is the feedback signal and the lower control signal is derived from the voltage divider.

4. The control circuit of claim 1 wherein the first energy storage device is a capacitor.

5. The control circuit of claim 4 wherein the second energy storage device is the same capacitor as that used for the first energy storage device.

6. The control circuit of claim 1 wherein the rates at which the first and second energy storage devices charge and discharge, respectively, are exponential.

7. The control circuit of claim 1 wherein the gate control signal assumes the first state for a first length of time equal to the charge time and a first IC response time, and the gate control signal assumes the second state for a second length of time equal to the discharge time and a second IC response time.

8. The control circuit of claim 1 wherein the electrical state of the first energy storage device follows a charge curve having a non-zero asymptotic limit as the first energy storage device is charging and the electrical state of the second energy storage device follows a discharge curve having a non-zero asymptotic limit as the second energy storage device is discharging.

9. A control circuit for use in a power converter, the power converter having a switch for alternately energizing and de-energizing a primary winding of a transformer, wherein the switch has a gate input for receiving a gate control signal, and the power converter produces a regulated voltage output signal, the control circuit comprising:

a timer circuit having a control input, a threshold input, a trigger input, and a timer output, wherein the control input establishes a control window bounded by an upper control value and a lower control value, the timer output assumes a first state based on a signal applied to the trigger input failing below the lower control value, the timer output assumes a second state based on a signal applied to the threshold input exceeding the upper control value, and the gate control signal is derived from the timer output;

a feedback circuit coupled to the regulated voltage output signal, wherein the feedback circuit produces a feedback control signal that is coupled to the control input of the timer circuit, and the feedback control signal varies based on a comparison between a voltage of the regulated voltage signal and a reference voltage;

a capacitor coupled to the threshold and trigger inputs of the timer circuit, to provide a signal based on a voltage across the capacitor to the threshold and trigger inputs;

a first resistive network coupled to the capacitor, for charging the capacitor when the timer output assumes the first state;

a second resistive network coupled to the capacitor, for discharging the capacitor when the timer output assumes the second state; and a switching network coupled to the first and second resistive networks and the timer output signal, for charging the capacitor for a charge time interval when the timer output assumes the first state and discharging the capacitor for a discharge time interval when the timer output assumes the second state, wherein the charge time interval and the discharge time interval each vary based on the feedback control signal.

10. The control circuit of claim 9 wherein the second resistive network is formed by selectively coupling a ground signal to the first resistive network.

11. The control circuit of claim 9 wherein the ground signal is provided by a discharge terminal of the timer circuit.

12. The control circuit of claim 9 wherein the voltage over the capacitor follows a voltage charge curve having a first non-zero asymptotic limit as the capacitor is charging and the voltage over the capacitor follows a voltage discharge curve having a second non-zero asymptotic limit as the capacitor is discharging.

13. A method of controlling a power converter having a switch for alternately energizing and de-energizing a primary winding of a transformer, wherein the switch has a gate input for receiving a gate control signal, and the power converter produces a regulated voltage output signal, the method comprising:

forming a feedback signal by comparing a compare signal based on the regulated voltage output signal to a reference signal;

forming an upper control signal and a lower control signal from the feedback signal;

charging a first energy storage device from a state equal to the lower control signal to a state equal to the upper control signal, wherein a charge interval is equal to a length of time required to charge the first energy storage device from the state equal to the lower control signal to the state equal to the upper control signal and varies based on the feedback signal;

discharging a first energy storage device from the state equal to the upper control signal to the state equal to the lower control signal, wherein a discharge interval is equal to a length of time required to discharge the first energy storage device from the state equal to the upper control signal to the state equal to the lower control signal and varies based on the feedback signal; and forming the gate control signal based upon the charge interval and the discharge interval.

14. The method of claim 13 wherein the first energy storage device traverses a first exponential curve having a first non-zero asymptotic limit as it is charged, and the second energy storage device traverses a second exponential curve having a second non-zero asymptotic limit as it is discharged, and the method further comprises:

varying the feedback signal in response to a light load to cause a more steep segment of the first exponential curve to be traversed and a less steep segment of the second exponential segment to be traversed; and varying the feedback signal in response to a heavy load to cause a less steep segment of the first exponential curve to be traversed and a more steep segment of the second curve to be traversed.

15. A power converter comprising:

a transformer comprising:
a primary winding; and
a secondary winding;

a switch for alternately energizing and de-energizing the primary winding, wherein the switch has a gate input for receiving a gate control signal an output rectifier and filter circuit coupled to the secondary winding and providing a regulated voltage output signal;

a timer circuit having a control input, a threshold input, a trigger input, a discharge terminal, and a timer output, wherein the control input establishes a control window bounded by an upper control value and a lower control value, the timer output assumes a first state based on a signal applied to the trigger input failing below the lower control value, the timer output assumes a second state based on a signal applied to the threshold input exceeding the upper control value, the discharge terminal is coupled to ground when the timer output assumes the second state, and the gate control signal is derived from the timer output;

a feedback circuit coupled to the regulated voltage output signal, wherein the feedback circuit produces a feedback control signal that is coupled to the control input of the timer circuit, and the feedback control signal varies based on a comparison between a voltage of the regulated voltage signal and a reference voltage;

a capacitor coupled to the threshold and trigger inputs of the timer circuit, to provide a signal based on a voltage across the capacitor to the threshold and trigger inputs; and a resistive network coupled to the capacitor and the discharge terminal, for charging the capacitor when the timer output assumes the first state and discharging the capacitor when the timer output assumes the second state, wherein a charge time during which the capacitor charges and a discharge time during which the capacitor discharges each vary with the feedback control signal.

16. The power converter of claim 15 wherein the voltage over the capacitor follows a voltage charge curve having a first non-zero asymptotic limit as the capacitor is charging and the voltage over the capacitor follows a voltage discharge curve having a second non-zero asymptotic limit as the capacitor is discharging.

* * * * *